(12) United States Patent
Milstein

(10) Patent No.: US 9,819,799 B2
(45) Date of Patent: Nov. 14, 2017

(54) SYSTEM AND METHOD FOR MONITORING CUSTOMER SATISFACTION IN AN ONGOING CALL CENTER INTERACTION

(71) Applicant: Intellisist, Inc., Seattle, WA (US)

(72) Inventor: David Milstein, Redmond, WA (US)

(73) Assignee: Intellisist, Inc., Seattle, WA (US)

( * ) Notice: Subject to any disclaimer, the term of this patent is extended or adjusted under 35 U.S.C. 154(b) by 0 days.

(21) Appl. No.: 14/746,506

(22) Filed: Jun. 22, 2015

(65) Prior Publication Data

US 2016/0373577 A1 Dec. 22, 2016

(51) Int. Cl.
*H04M 3/00* (2006.01)
*H04M 5/00* (2006.01)
*H04M 3/51* (2006.01)

(52) U.S. Cl.
CPC .. *H04M 3/5175* (2013.01); *H04M 2203/2038* (2013.01)

(58) Field of Classification Search
CPC ............. H04M 3/5238; H04M 3/5175; H04M 3/5191; H04M 3/51

USPC ........... 379/265.03, 265.06, 266.06, 265.09, 379/265.07, 265.05
See application file for complete search history.

(56) References Cited

U.S. PATENT DOCUMENTS

| | | | |
|---|---|---|---|
| 7,343,406 B1 * | 3/2008 | Buonanno | G06Q 10/06 705/1.1 |
| 9,167,094 B2 * | 10/2015 | O'Connor | H04M 3/5175 |
| 2014/0044250 A1 * | 2/2014 | Gartner | H04M 3/00 379/265.09 |
| 2015/0215464 A1 * | 7/2015 | Shaffer | H04M 3/5238 379/266.06 |

* cited by examiner

*Primary Examiner* — Thjuan K Addy
(74) *Attorney, Agent, or Firm* — Patrick J. S Inouye; Leonid Kisselev

(57) ABSTRACT

A system and method for monitoring customer satisfaction in an ongoing call center interaction is provided. Information about a signal indicating customer dissatisfaction is provided to one or more customers of a call center prior to a start of interactions between one or more agents of the call center and the one or more customers. The interactions are began, including connecting one of the customers to one of the agents by call center after the information is provided. The interactions are monitored for a receipt of the signal from the customer. An action is taken by the call center upon a receipt of the signal.

20 Claims, 5 Drawing Sheets

Fig. 5.
70

| Agent | Interaction ID | Start time | Length | Hold time |
|---|---|---|---|---|
| Karl Rostak | 7J5NEJPO0OMN881 | 2014-01-19 16:34:29 | 39:80 | 8:15 |
| Jenny Kim | 4K9NEJOO2OMN881 | 2014-01-19 16:44:01 | 20:58 | 03:32 |
| Bethany Boyl | R2VJ73PPOM88KX1 | 2014-01-19 16:48:51 | 16:08 | 05:18 |
| Job Anderson | J55EEJO00MN81PLL | 2014-01-19 16:58:25 | 06:34 | 01:11 |

71 72 73 74 75

SYSTEM AND METHOD FOR MONITORING CUSTOMER SATISFACTION IN AN ONGOING CALL CENTER INTERACTION

FIELD

This application relates in general to remotely interacting with customers, and, in particular, to a system and method for monitoring customer satisfaction in an ongoing customer interaction.

BACKGROUND

For many organizations, such as businesses, government agencies, and educational institutions, customer call centers, or simply, call centers are the first point of contact when a customer seeks assistance from that organization or wants to order a product or service offered by the organization. While interactions between agents of a call center and the customers can occur via a variety of mediums, such as telephone, including data network-based telephone services, such as Voice-Over-Internet (VoIP), or via Web applications, keeping the customers satisfied during the interactions remains of prime importance for retaining the business of these customers regardless of the medium involved.

Unfortunately, customer dissatisfaction may be difficult to detect before such dissatisfaction rises to a level that can threaten retention of the customer's business. For example, conventionally, any problems experienced by the customer during a course of an interaction, such as a phone call, can only be remedied by asking to speak with a supervisor of the agent involved in the interaction, hanging up, or ending the call. Resorting to these options can prolong the time necessary to finish the call and require further calls to be made to the call center, which can cause further customer frustration and decrease call center efficiency.

Furthermore, one supervisor generally supervises multiple agents of the call center and controlling progression of all ongoing interactions becomes a difficult task, with the difficulty increasing proportionally to the number of agents being supervised. Unless a customer directly asks for the supervisor to be involved, the supervisor conventionally may not be able to detect that the customer is dissatisfied with the interaction. In turn, the customer may be reluctant to directly ask for the agent to involve the supervisor, out of politeness or a desire to avoid confrontation with the agent involved, until the customer's frustration reaches a level at which the relationship with the customer is already damaged. Once the supervisor does get involved, the supervisor may not be able to undo the damage to the relationship caused by the problems that the customer encountered.

Accordingly, there is a need for a way to detect customer dissatisfaction during an ongoing call center interaction and to make a supervisor of the agent involved in the interaction aware of the detected dissatisfaction.

SUMMARY

Customer satisfaction can be improved by allowing a customer to signal dissatisfaction during an interaction with an agent of a call center. The customer can give a signal of dissatisfaction in a way that is not perceived by the agent involved in the interaction, such as by pressing a certain combination of buttons on the customer's phone. The call center monitors the interaction for receipt of the signal, and takes action upon receiving the signal. In addition, if the signal is not received after a predefined duration of time, the call center can send in a check-in request and measure customer satisfaction based on the response to the check-in request, taking action if dissatisfaction is detected. Further, a status of ongoing interactions can be displayed to a supervisor of agents involved in the ongoing interactions on a map, and a status can change upon receipt of the signal of dissatisfaction, letting the supervisor know which interactions need his or her attention. As a result, the call center can spot customer dissatisfaction early on, before damage is done to the relationship with the customer, and can attempt to remedy problems causing customer frustration. In addition, the customer becomes empowered to control quality of the customer's interaction with the call center.

In one embodiment, a system and method for monitoring customer satisfaction in an ongoing call center interaction are provided. Information about a signal indicating customer dissatisfaction is provided to one or more customers of a call center prior to a start of interactions between one or more agents of the call center and the one or more customers. The interactions are started, including connecting one of the customers to one of the agents by call center after the information is provided. The interactions are monitored for a receipt of the signal from the customer. An action is taken by the call center upon a receipt of the signal.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

FIG. 5 shows a table of metrics associated with an ongoing interaction in accordance with one embodiment.

DETAILED DESCRIPTION

Figure 1:
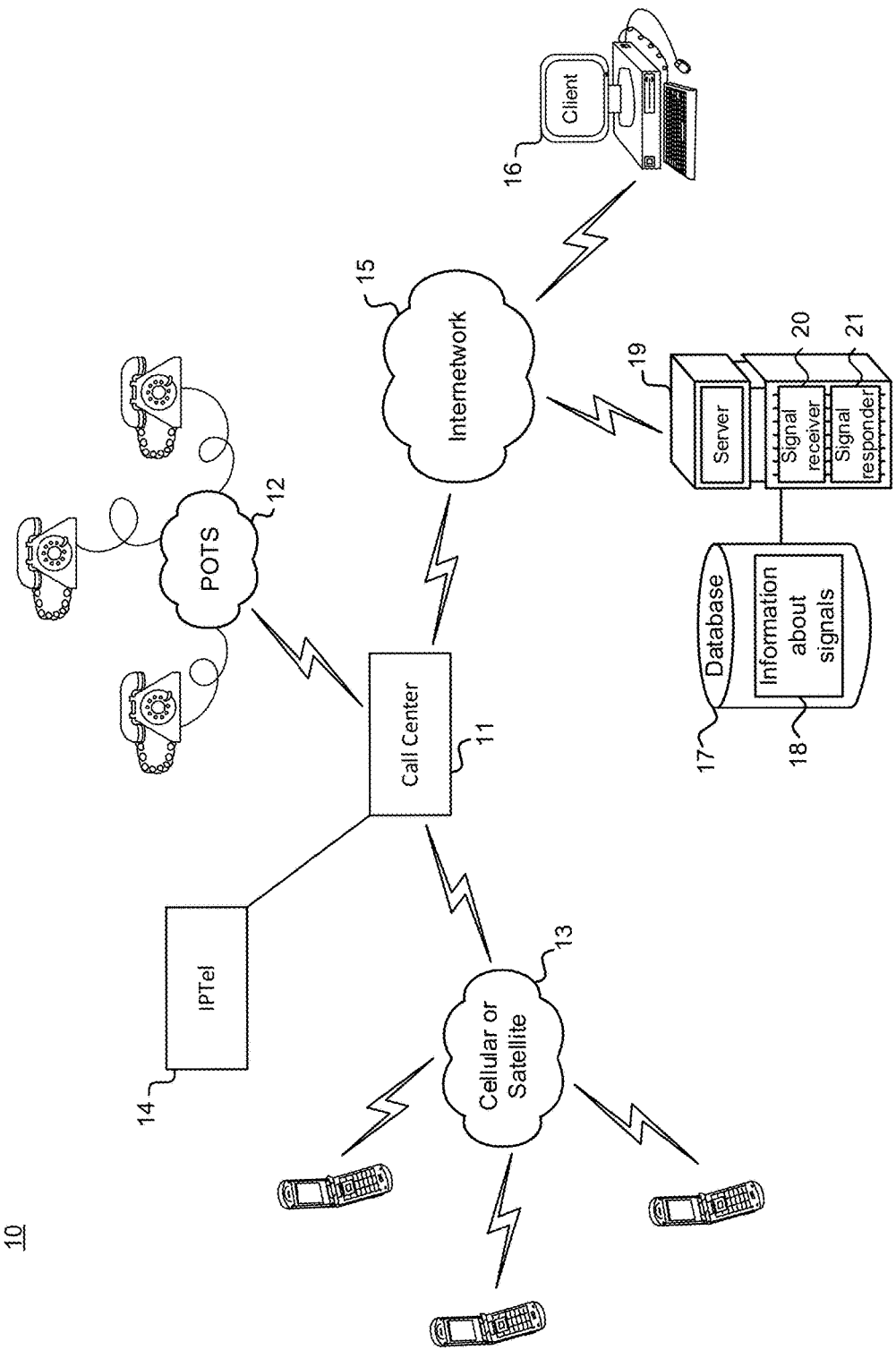
FIG. 1 is a block diagram showing a system for monitoring customer satisfaction in an ongoing call center interaction in accordance with one embodiment.

Providing customers a way to signal dissatisfaction empowers the customers in their dealings with a call center and allows call centers to detect issues during interactions before these issues cause significant harm. FIG. 1 is a block diagram showing a system 10 for monitoring customer satisfaction in an ongoing call center interaction, in accordance with one embodiment. By way of example, a multiplicity of customers or other users associated with an automated call center 11 can interact with the call center 11 via various mediums, such as through voice communication. The ways to use voice communication include Plain Old Telephone Service (POTS) 12, cellular and satellite telephones 13, and Internet telephony (IPTel) 14, including Voice over IP (VoIP) technology that can be implemented through a connection to an Internetwork 15, such as the Internet or a cellular network. Other forms of telephony and voice-based communications can be used, as would be recognized by one skilled in the art. Users can also call to or interface with the automated call center 11 through other data transmission ways such as through the Internetwork 15 using conventional network clients 16. While the client 16 is shown as a desktop computer, other types of devices can be used, including mobile devices such as smartphones and tablets. The data can be transmitted to and from the call center 11 via text messages, emails, or chatrooms. In a further embodiment, the data transmitted can include videos. Other ways for customers to interact with the automated call center 11 are possible.

The automated call center 11 provides a single source of support and problem resolution for customers seeking direct assistance from manufacturers and service vendors, although automated call centers 11 can also be used in other areas of commerce. Although the automated call center 11 is shown as a single point within the system 10, the automated call center 11 could include one or more logically interconnected but physically separate, including geographically connected, operations, which provide a logically unified automated call center 11.

The system 10 further includes a database 17 of information 18 about one or more signals that a customer involved in an interaction with an agent of the call center 11 can give to show dissatisfaction with how an ongoing interaction progresses. A customer interaction can be any contact between a customer, an entity that contacted the call center 11, and a party associated with the call center 11, such as an agent of the call center. Such a contact can include the agent interacting with the customer directly, such as via text, audio, or video, or by controlling an execution of a script, with customer speech being recognized and converted into written messages presented to the agent and written messages from the agent being converted into synthesized speech delivered to the customer, as further described in commonly-owned U.S. Pat. No. 8,170,197, issued on May 1, 2012, the disclosure of which is incorporated by reference. The dissatisfaction can be with any aspect of the interaction, including the performance of the agent in the interaction, the length of the interaction, or the speed with which the customer's concerns are being resolved.

The signaling of the dissatisfaction can be initiated by the customer, such as by pressing a button or a combination of buttons, such as ##0, on a touchtone phone when dissatisfied with the progression of the interaction. When interacting with the call center 11 through other mediums, the customer can similarly give the signal in a way appropriate for the medium. For example, if the customer is interacting with the call center 11 through online chat, such as via the client 16, an appropriate button that the customer can press to provide the signal can be provided on a user interface of the program through which the customer participates in the chat. Still other ways for the customer to initiate the provision of the signal are possible.

The information 18 can also be about other kinds of signals. For example, the call center 11 can initiate the receipt of the signal from the customer. For instance, as described further below, during an interaction, the call center 11 can request the customer to provide a rating of satisfaction with the interaction; once the rating is received from the customer, the rating can be compared to a threshold included in the information 18, and if the threshold is not satisfied, the received rating is determined to be a signal that the customer is dissatisfied. Still other kinds of the signal that the customer is dissatisfied are possible.

The database 17 is connected to one or more monitoring servers 19 connected to the Internetwork 15. The servers 19 execute a signal receiver 20 that, as described further below with reference to FIG. 2, can provide to the customer at least a part of the information 18 stored in the database 17, and receives the signal from the customer if the customer is dissatisfied. For instance, once a connection between the customer and the call center 11 is established but before the customer begins interacting with the agent, the receiver 20 informs the customer that the customer can press ##0, or one or more other buttons, on the customer's cellular phone 13, if the customer is dissatisfied with the ongoing interaction. If the customer presses the required buttons, the receiver 20 receives the signal from the phone 13 over the Internetwork 15. Whether the receiver 20 provides the information 18 and the manner in which the information 18 is provided can depend on factors such as characteristics of the customer and the conditions of the call center, as further described with reference to FIG. 2.

Similarly, the receiver 20 can initiate the receipt of the signal by checking whether the customer is satisfied with the progress of the interaction while the interaction is ongoing. For example, as mentioned above, the receiver 20 can send a request to the customer to rate their ongoing interaction, receive the response that includes the rating from the customer, compare the rating to a predefined threshold, and determine that the response is the signal that the customer is dissatisfied if the rating falls below the threshold. In a further embodiment, the receiver 20 can request the customer to answer whether the customer is satisfied with the ongoing interaction. The receipt of the answer "no," can be determined to be the signal that the customer is dissatisfied. Whether the receiver 20 sends the request and the kind of request sent can depend on factors such as characteristics of the customer and the conditions of the call center, as further described with reference to FIG. 2.

Communications between the monitoring servers 19 and the customer regarding the customer's satisfaction can be hidden from the agent. For example, when a customer signals dissatisfaction by pressing the combination of numbers on the customer's phone, the signal is not provided to the agent involved in the interaction and the customer. Similarly, the requests sent to the customer and the customers responses can be hidden from the agent involved in the interaction. For example, the request can be transmitted as a verbal "whisper", a verbal message that the customer, but not the agent, can hear; similarly, when the customer is verbally providing the response, the customer can be momentarily disconnected from the agent and reconnected upon receipt of the response. Likewise, if the customer interacts via the client 16, the request can appear in a pop-up window of the client's 16 Internet browser, and the customer can type in the response into the pop-up window. Similarly, the request can be sent via a text message, such as an instant message or an SMS message sent to an instant messaging account or a phone number associated with the customer, and the customer can respond via another instant message or an SMS message respectively. Other ways to provide the request and receive a response without neither the request nor the response being visible to the agent are possible.

The servers 19 further executes a signal responder 21 that can take action upon receiving the signal. For example, the responder 21 can represent multiple ongoing interactions on a map that is presented to a supervisor of the agents involved in the interactions, as further described with reference to FIG. 4. The representations can include an identifier of the interaction, such a number associated with the interaction or a name of the agent involved, and a status of the interaction such as a symbol, and word, or a color. The map can be displayed on a console of the supervisor (not shown) in the call center 11, though other ways to present the map are also possible. Once the signal is received, the responder 21 can take action by changing the status of the interaction on the map, such as by switching the color of the representation of that interaction from green to red, which would notify the supervisor that the customer in that interaction is dissatisfied with how the interaction progresses. At that point, the supervisor can intervene into the interaction to the resolve the customer's concerns. Other ways to notify the supervisor, such as by sending a message to the supervisor's console, are possible. Whether the responder 21 takes action upon receiving the signal and the kind of action that is taken can depend on factors such as characteristics of the customer and the conditions of the call center, as further described with reference to FIG. 2.

In addition to notifying the supervisor, other actions can be taken by the responder 21 upon the receipt of the signal. For example, if the customer signals the dissatisfaction, the customer can be transferred to a different agent, such as a more experienced agent or an agent whose characteristics are better suited for the particular customer, as described in a commonly-owned U.S. Patent Application Publication No. 20130016815, published Jan. 17, 2013, the disclosure of which is incorporated by reference.

Figure 4:
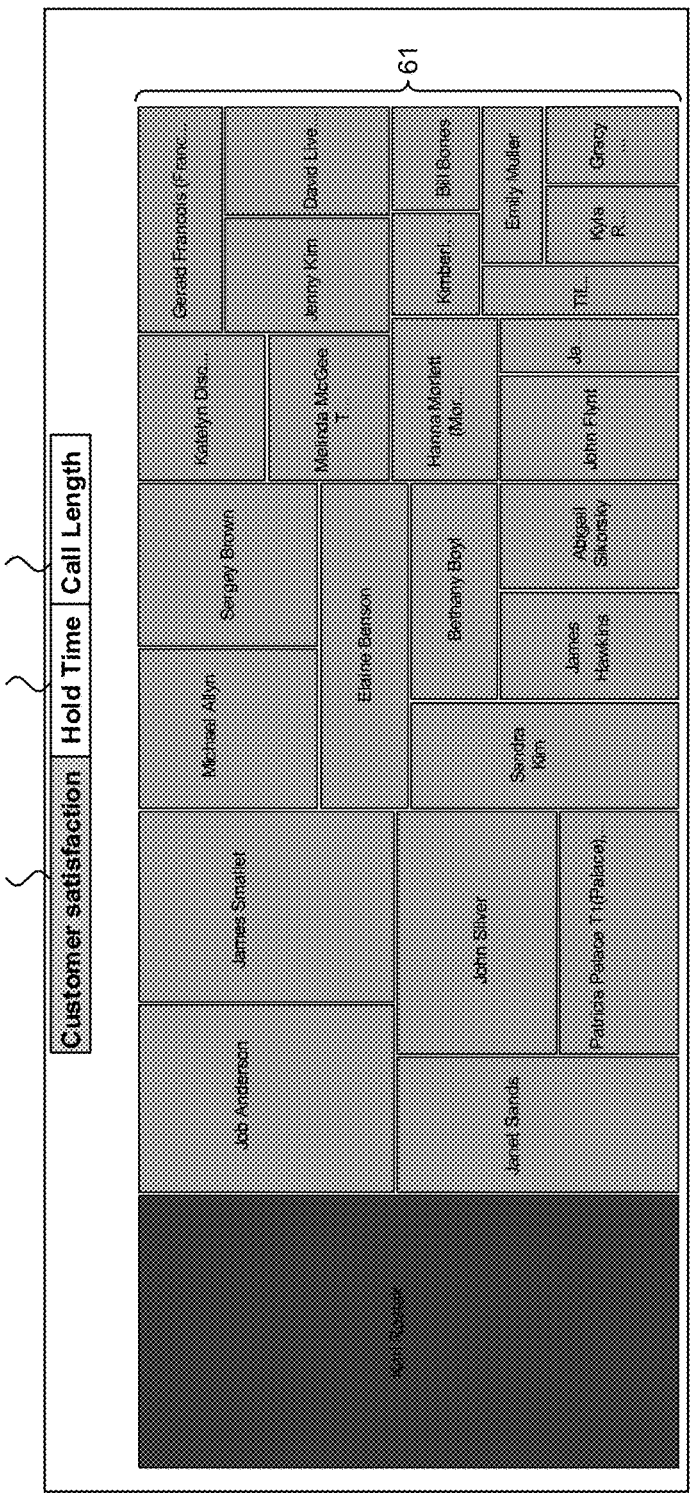
FIG. 4 shows a map of ongoing interactions that can be presented to a supervisor of the agents involved in the interactions in accordance with one embodiment.

In addition to monitoring whether a signal of customer dissatisfaction is received, the servers 19 can also monitor other metrics associated with the ongoing interactions, such as the length of the interactions and the amount of time the user is on hold, and visually represent these metrics as further described below with reference to FIGS. 4 and 5.

The one or more servers 19 can include components conventionally found in general purpose programmable computing devices, such as a central processing unit, memory, input/output ports, network interfaces, and non-volatile storage, although other components are possible. The one or more servers 19 can include one or more modules for carrying out the embodiments disclosed herein. The modules can be implemented as a computer program or procedure written as source code in a conventional programming language and that is presented for execution by the central processing unit as object or byte code. Alternatively, the modules could also be implemented in hardware, either as integrated circuitry or burned into read-only memory components, and each of the servers 19 can act as a specialized computer. For instance, when the modules are implemented as hardware, that particular hardware is specialized to perform monitoring for the receipt of the signal and computers without the hardware cannot be used for that purpose. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

The one or more servers 19 can be in a cloud-computing environment or be a dedicated servers. Also, while the servers 19 and the database 17 are shown with reference to FIG. 1 as external to the call center 11 and communicating with the call center 11 and the customers through the Internetwork 15, in a further embodiment, the servers 19 and the database 17 can be a part of the call center 11.

Figure 2:
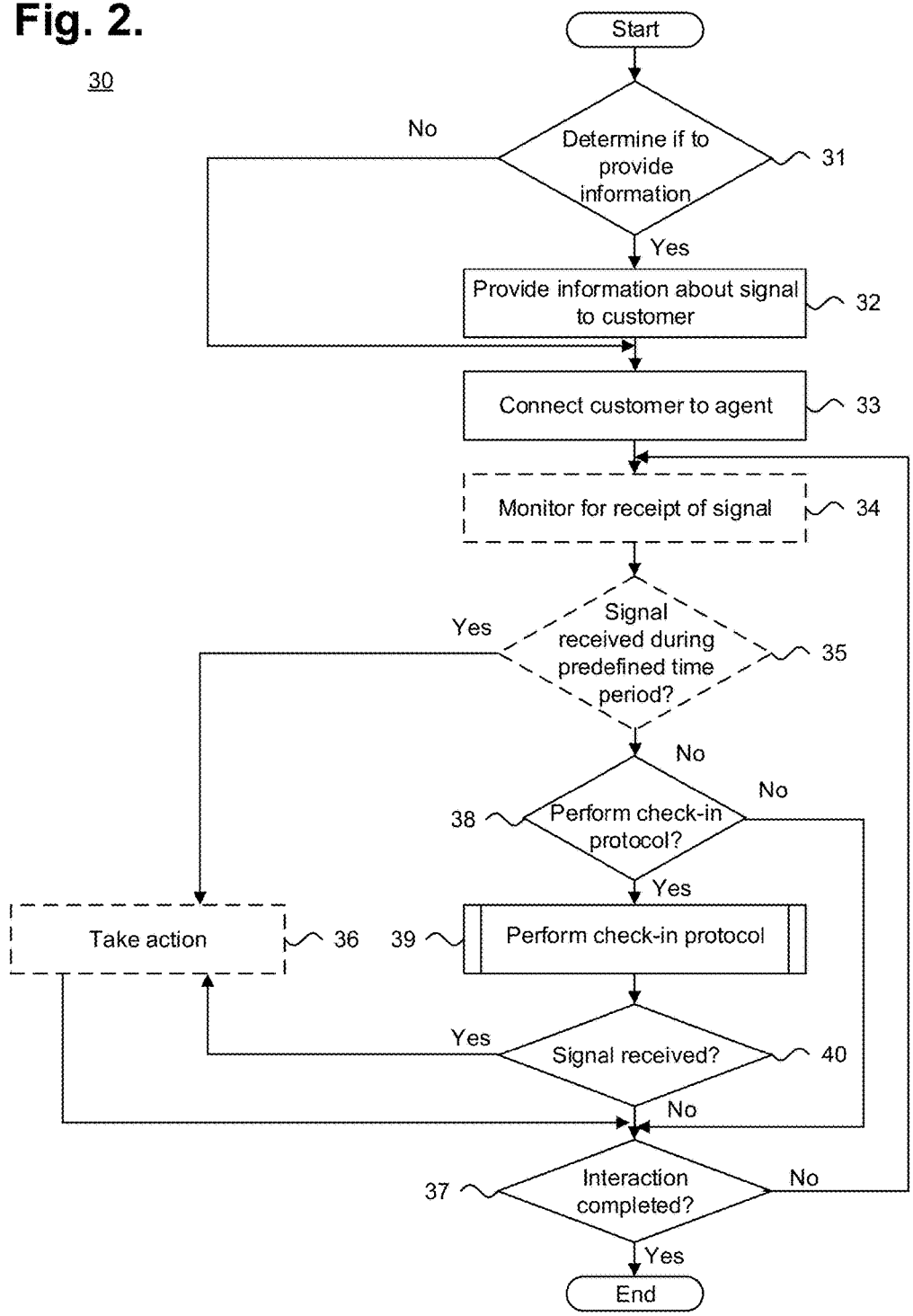
FIG. 2 is a flow diagram showing a method for monitoring customer satisfaction in an ongoing call center interaction in accordance with one embodiment.

FIG. 2 is a flow diagram showing a method 30 for monitoring customer satisfaction in an ongoing call center interaction in accordance with one embodiment. Prior to a start of an interaction between an agent of the call center 11 and the customer, the call center 11 determines whether to provide the information about the signal to the customer (step 31). The determination can be made based on factors such as characteristics of the customer in question and conditions of the call center 11 at the time the message is provided, though other characteristics are possible. The characteristics of the customer can reflect customer importance and can include the duration of time the customer has had an account serviced by the call center 11, the customer's financial value to the call center 11, and the customer's age; other kinds of customer characteristics are possible. The circumstances can include current conditions of the call center 11, such as whether the information is to be delivered at a busy time of day and whether there are any technical issues in the call center 11. Thus, for example, the information can be provided to a veteran customer of the call center 11 with a high financial value regardless of how busy the call center 11 is, while being provided to a new customer only if the call center 11 is not busy. Other ways of how the call center 11 can use the factors to determine whether to provide the information are also possible. If the call center 11 determines not to provide the information (step 31), the method 30 moves to step 33, during which the customer is connected to the agent and the interaction begins. If the call center determines to provide the information, the information about the signal is provided to a customer (step 32), such as via an automated audio message that is played to the customer and that explains to the customer how to indicate dissatisfaction. For example, if the interaction takes place via a phone, prior to connecting the agent to the customer, the automated message lets the customer know of a way to signal dissatisfaction by pressing a combination of buttons on the customer's phone. Other ways to provide the information are possible. The information does not have to be delivered to all of the customers in the same manner and parameters of the message, such as message length, providing the information can vary based on the factors described above. Once the information is provided, the customer is connected to the agent, beginning the interaction (step 33).

Optionally, if the information about the signal has been provided to the customer, the servers 19 monitor whether the signal has been received from the customer (step 34). Optionally, while monitoring, the servers 19 also output whether the signal has been received in the interaction (not shown), along with statuses of other ongoing interactions. For example, in one embodiment, whether the signal has been received can be output via a heat map, as described below with reference to FIG. 4. In a further embodiment, the servers 19 can also monitor metrics associated with the interactions, such as interaction length and the amount of time the customer is on hold, and also output these metrics, as described further below with reference to FIGS. 4 and 5.

Optionally, if the information about the signal has been provided to the customer, whether the signal of customer dissatisfaction is received in a predefined time period is determined by the servers 19 (step 35). If the signal has been received during the predefined time period (step 35), the servers 19 optionally takes an action, such as described above with reference to FIG. 1, upon receiving the signal (step 36). Whether the server 19 takes action upon receiving the signal can be based on the factors described above with reference to step 31, such as the characteristics of the customer and the conditions of the call center 11. For example, if the call center 11 is busy, an action can be taken only for a veteran customer of a high financial value to the call center 11. Other ways the server 19 can use the factors to decide whether to take the action are possible. In a further embodiment, the servers 19 always take an action upon receiving the signal. The predefined time period can be counted from the beginning of the interaction, or, if step 35 is not performed for a first time, the time period can be counted from the last time step 35 was performed. The actions taken in step 36 can include one or more of notifying the supervisor of the agent involved in the interaction of the signal, such as by updating the status of the interaction on the heat map, or transferring the customer to a different agent, though other actions are possible. The kind of action to be taken can depend on the factors described above, such as characteristics of the customer and the conditions of the call center; for example, if the call center 11, the supervisor can be notified of the signal, but no transfer to a different agent is done, though other examples are possible. After optionally taking (or not taking) the action (step 36), the servers 19 determine whether the interaction is over, completed, which can occur when the agent and the customer lose contact with each other, such as a customer hanging up on the phone call with a call center (step 37). If the interaction has been completed (step 37), the method 30 ends. If the interaction has not been completed (step 37), the method 30 returns to step 34 described above.

If the signal has not been the received during a predefined time period since the start of the interaction (step 35), the servers 19 determine whether to perform a check-in protocol to check a level of customer satisfaction (step 38). The determination can be based on of the call center 11 described above with reference to step 31, such as the characteristics of the customer and the conditions of the call center 11 described above with reference to step 31. For example, if the call center 11 is busy, the determination can be made to perform the check-in protocol only for a veteran customer of a high financial value to the call center 11. Other ways the server 19 can use the factors to decide whether to take action are possible. If the determination is made to perform the check-in protocol (step 38), the check-in protocol is performed, as further described below with reference to FIG. 3 (step 39). The kind of the check-in protocol to be performed can also depend on the factors described above, such customer characteristics and conditions of the call center 11. If the signal has been received by the servers 19 as a result of the check-in protocol (step 40), the method 30 returns to step 36 described above. If the signal has not been received as a result of the check-in protocol (step 40), the method 30 returns to step 37 described above, determining if the interaction has been completed. If the determination is made not to perform the check-in protocol (step 38), the method 30 returns to step 37 described above.

Figure 3:
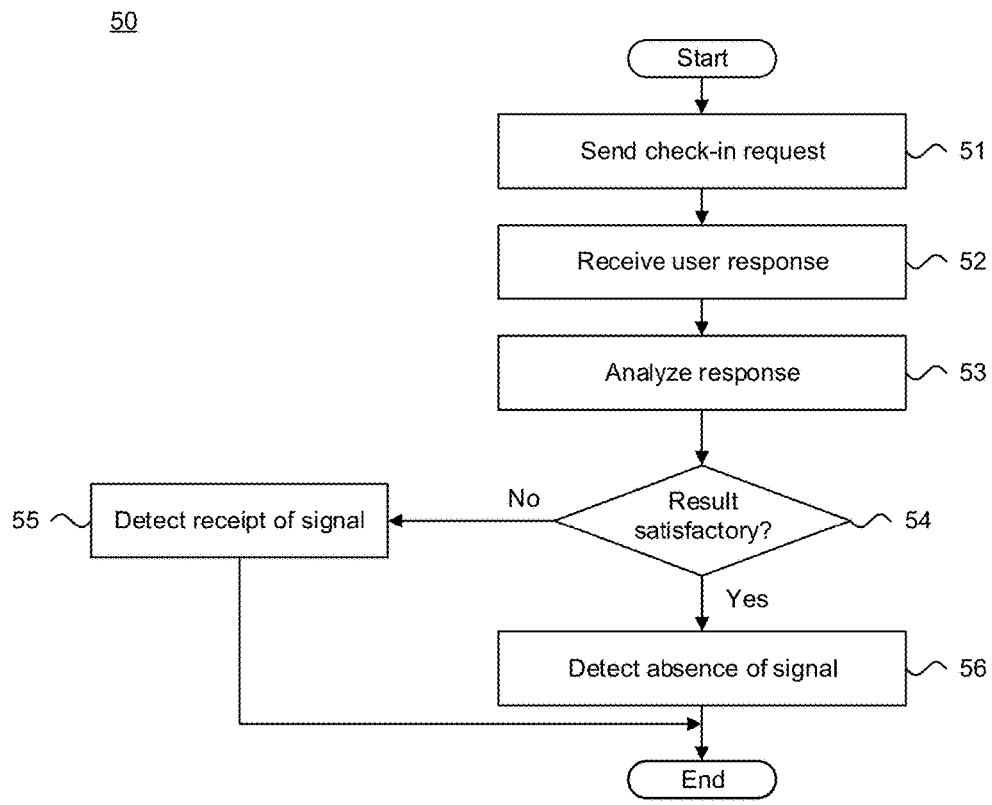
FIG. 3 is a flow diagram showing a routine for performing a check-in protocol for use in the method of FIG. 2, in accordance with one embodiment.

Periodically checking in with the customer during an ongoing interaction allows to detect customer dissatisfaction even if the customer has forgotten the provided information 18 or for some other reasons has not given the signal despite being dissatisfied with the interaction. FIG. 3 is a flow diagram showing a routine 50 for performing a check-in protocol for use in the method 30 of FIG. 2, in accordance with one embodiment. Initially, a check-in request is sent to the customer without letting the agent involved in the interaction know of the request, such as by sending the request via a verbal whisper, a pop-up window, an SMS message, or an instant message (step 51). In one embodiment, the request can include asking the customer to give the interaction a rating based on how satisfied the customer is with the interaction. In a further embodiment, the request includes a question with a binary answer, such as whether or not the customer is satisfied with the interaction. Still other kinds of requests are possible.

A user response to the request is received (step 52). The response can include the rating or the answer to the binary question, though other kinds of responses are possible. The received a response is analyzed (step 53). In one embodiment, the analysis can include comparing the rating to a predefined threshold. In the further embodiment where the response includes an answer to the binary question, the analysis can include comparing the answer to a predefined answer, such as yes or no. Other kinds of analysis are also possible.

If the results of the analysis are satisfactory, such as when the rating satisfies the threshold or the received answer matches the predefined answer (step 54), an absence of the signal is detected (step 55), ending the routine 50. If the results of the analysis are not satisfactory, such as when the rating does not meet the applied threshold or the received answer does not match the predefined answer, receipt of the signal that the customer is dissatisfied is detected (step 56), ending the routine 50.

Representing ongoing interactions on a map presented to the supervisor of the agents involved in the interactions and showing on that map when the customer provides a signal of dissatisfaction allows the supervisor to quickly identify the interactions that require his or her attention. FIG. 4 shows a map 60 of ongoing interactions that can be presented to a supervisor of the agents involved in the interactions in accordance with one embodiment. As seen with reference to FIG. 4, the ongoing interactions are represented by rectangular boxes 61 that include an identifier of the interactions, such as a name of the agent involved. Other shapes of the boxes and other identifiers of the interactions are also possible. While the boxes 61 shown with reference to FIG. 4 are shown as being of varying sizes, in a further embodiment, the boxes can be of the same size.

The supervisor or another user can select, such as by clicking with a mouse, one or more metrics 62-64 associated with the ongoing interactions 61. The metrics 62-64 can be monitored and reflected in the representations of the interactions 61. For example, if customer satisfaction 62 metric is selected, the representation of each of the interactions can be with a color that indicates whether the signal has been the received for that interaction. For example, as mentioned above, an interaction where the signal of the dissatisfaction has not been received can be shown with the color green while the interaction where the customer has signaled dissatisfaction can be shown in the color red. For instance, the interaction involving an agent named Karl Rostak is shown in red, with the customer having given the signal of dissatisfaction. Other colors can also be used to show the receipt of the signal. Other ways to visually indicate whether the signal has been received, such as through using words and symbols, are also possible.

Other metrics 63-64 associated with the interactions can also be chosen by the user for display on the map 60. For example, the user can select the metrics such as hold time 63 or call length 64 and the representations of the interactions will reflect the selected metrics. For instance, if the interaction occurs via phone, the amount of time the customer is on hold 63 and the length of the call 64 can be monitored by the monitoring servers 19 and reflected on the map. If the metrics exceed a threshold, the representation of the interaction can change. In one embodiment, the threshold can be set by a user for all interactions. In a further embodiment, the threshold can be determined based on a type of interactions to which an interaction belongs, as further described in a commonly-owned U.S. patent application Ser. No. 14/300,087, entitled "Computer-Implemented System and Method for Dynamically Providing Guidance During Customer Interactions," the disclosure of which is incorporated by reference. The threshold can be set for each type of the interactions by the user; alternatively, an average for a particular metric can be determined among the interactions of the same type, and the average can be set as the threshold. Other ways to set the threshold are possible.

In a still further embodiment, customer satisfaction 62 and other metrics 63-64 can be displayed separately from each other. In one embodiment, the metrics 63-64 can be reflected on a separate heat map, such the one as shown in FIG. 4, which can be displayed simultaneously with the heat map 60 reflecting customer satisfaction 62. Alternatively, the metrics 63-64 can be displayed in a different format, such as in a table on an interactive dashboard of the supervisor. FIG. 5 shows a table 70 of metrics associated with an ongoing interaction in accordance with one embodiment. The interactions are identified by name of the agent involved 71, interaction ID 72, and start time of the interactions 73, though other characteristics identifying the interactions can be listed. The metrics associated with the interactions, such as interaction length 74 and the time the customer is on hold 75, are listed next to the identifying characteristics 71-73. Other metrics are also possible. Each metric for each interaction can be shown with a color that represents a status of that metric: whether that metric within a normal range. The color green can indicate that the metric is within a normal range, yellow can indicate that the metric will soon be outside the normal range, and red can indicate that the metric is outside the normal range and help is needed on the interaction. For example, for the interaction involving the agent Karl Rostak, the length 74 and hold time 75 are shown in red because both the metrics are outside the normal range. The supervisor can assist by participating in the interaction to resolve any outstanding concerns of the customer and expedite completion of the interaction. Similarly, once a metric has been highlighted in the table 70 in color yellow, such as the length of the interaction involving the agent named Jenny Kim, the supervisor can participate in the interaction to complete the interaction before the metric gets outside the normal range. Other ways to show whether the metrics are within range are possible. Other information associated with the interaction, such as a particular type of customer involved or information about the agent involved in the interaction can also be shown in the table 70.

While the invention has been particularly shown and described as referenced to the embodiments thereof, those skilled in the art will understand that the foregoing and other changes in form and detail may be made therein without departing from the spirit and scope of the invention.

What is claimed is:

1. A system for monitoring customer satisfaction in an ongoing call center interaction, comprising:
   at least one processor configured to execute computer-executable code, comprising:
      a determination module configured to determine whether to provide information about giving a signal by a customer of a call center indicating a dissatisfaction of the customer to the customer based on at least one of one or more characteristics of the customer and one or more conditions of the call center;
      a signal module configured to provide, based on the determination, the information about giving the signal by the customer of the call center indicating the dissatisfaction of the customer to the customer prior to an interaction between the customer and one of a plurality of agents of a call center;
      a connection module configured to begin the interaction comprising connecting the customer to one of the agents after the information is provided;
      a monitoring module configured to monitor for a receipt of the signal from the customer during the interaction; and
      an action module configured to take action upon the receipt of the signal.

2. A system according to claim 1, further comprising:
   a request module configured to, upon not receiving the signal during a predefined time period, send the customer a request to indicate a level of satisfaction with the interaction;
   a response module configured to receive a response to the request from the customer; and
   an analyzer module configured to analyze the received response and detect the receipt of the signal based on the response.

3. A system according to claim 2, further comprising:
   a request determination module configured determine whether to send the request based on at least one of one or more of the characteristics of the customer and one or more of the conditions of the call center.

4. A system according to claim 2, wherein the response comprises a rating associated with the interaction, further comprising:
   a comparison module configured to compare the rating to a threshold; and
   a detection module configured to detect the receipt of the signal upon the rating not meeting the threshold.

5. A system according to claim 2, wherein the check-in request comprises at least one of a verbal whisper, a pop-up window, an instant message, and an SMS message.

6. A system according to claim 1, wherein the receipt of the signal is not known to the one agent.

7. A system according to claim 1, further comprising:
   a display configured to display a representation of the interaction to a supervisor of agent, wherein the action comprises changing the representation upon receiving the signal from the customer in the interaction.

8. A system according to claim 7, further comprising:
   wherein the representation comprises an identifier of the interaction and a status of whether the signal has been received for the interaction.

9. A system according to claim 7, wherein the representation further depends upon one or more metrics of the interaction, the metrics comprising at least one of a length of the interaction and a hold time in the interaction.

10. A system according to claim 1, wherein the signal comprises one or more buttons pressed on a phone associated with the customer.

11. A method for monitoring customer satisfaction in an ongoing call center interaction, comprising:
   determining whether to provide information about giving a signal by a customer of a call center indicating a dissatisfaction of the customer to the customer based on at least one of one or more characteristics of the customer and one or more conditions of the call center;

providing, based on the determination, the information about giving the signal by the customer of the call center indicating the dissatisfaction of the customer to the customer prior to an interaction between the customer and one of a plurality of agents of the call center;

beginning the interaction comprising connecting the customer to one of the agents after the information is provided;

monitoring for a receipt of the signal from the customer during the interaction; and taking an action upon the receipt of the signal, wherein the steps are performed by at least one suitably-programmed computer.

12. A method according to claim 11, further comprising:
upon not receiving the signal during a predefined time period, sending the customer a request to indicate a level of satisfaction with the interaction;

receiving a response to the request from the customer; and analyzing the received response and detecting the receipt of the signal based on the response.

13. A method according to claim 12, further comprising:
determining whether to send the request based on at least one of one or more the characteristics of the customer and one or more of the conditions of the call center.

14. A method according to claim 12, wherein the response comprises a rating associated with the interaction, further comprising:

comparing the rating to a threshold, and upon the rating not meeting the threshold, detecting the receipt of the signal.

15. A method according to claim 12, wherein the check-in request comprises at least one of a verbal message, a pop-up window, an instant message and an SMS message.

16. A method according to claim 11, wherein the receipt of the signal is not known to the one agent.

17. A method according to claim 11, further comprising:
displaying on a display a representation of the interaction to a supervisor of agent, wherein the action comprises changing the representation of interaction upon receiving the signal from the customer in the interaction.

18. A method according to claim 17, further comprising:
wherein the representation comprises an identifier of that interaction and a status of whether the signal has been received for the interaction.

19. A method according to claim 17, wherein the representation depends upon one or more metrics of the interaction, the metrics comprising at least one of a length of the interaction and a hold time in the interaction.

20. A method according to claim 11, wherein the signal comprises one or more buttons pressed on a phone associated with the customer.

* * * * *